(12) United States Patent
Merten et al.

(10) Patent No.: US 6,959,769 B2
(45) Date of Patent: Nov. 1, 2005

(54) PLOUGH CHAIN STRAND COMPRISING A CHAIN LOCK LINK

(75) Inventors: Gerhard Merten, Lünen (DE); Adam Klabisch, Dortmund (DE); Jürgen Berghoff, Holzwickede (DE); Rainer Benecke, Dortmund (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 10/483,478
(22) PCT Filed: Apr. 10, 2003
(86) PCT No.: PCT/EP03/03730
§ 371 (c)(1),
(2), (4) Date: Jan. 12, 2004
(87) PCT Pub. No.: WO03/087622
PCT Pub. Date: Oct. 23, 2003

(65) Prior Publication Data
US 2004/0187360 A1 Sep. 30, 2004

(30) Foreign Application Priority Data
Apr. 12, 2002 (DE) .......................... 102 16 461

(51) Int. Cl.⁷ .......................... A01B 35/00; F16G 15/04
(52) U.S. Cl. .............................. 172/612; 59/85; 59/87
(58) Field of Search ............................ 59/78, 84–89, 59/93; 37/466; 172/197, 199, 189, 612, 776

(56) References Cited

U.S. PATENT DOCUMENTS 4,134,255 A   1/1979  McBain et al. ................. 59/78
4,182,116 A   1/1980  Clement ......................... 59/93
6,021,634 A * 2/2000  Brodziak ........................ 59/85

FOREIGN PATENT DOCUMENTS

| DE | 19 39 000 | 2/1971 |
| DE | 27 26 235 | 12/1978 |
| DE | 43 32 379 C1 | 9/1994 |
| DE | 44 20 203 A1 | 12/1995 |
| DE | 199 01 232 A1 | 7/2000 |
| GB | 693734 | 7/1953 |
| RU | 2001334 | 10/1993 |
| SU | 520475 | 7/1976 |

OTHER PUBLICATIONS

Search Report from related Russian National Phase Application of PCT/EP03/03730.

* cited by examiner

Primary Examiner—Christopher J. Novosad
(74) Attorney, Agent, or Firm—Fay, Sharpe, Fagan, Minnich & McKee, LLP

(57) ABSTRACT

The invention relates to a plough chain strand 50 with horizontal chain links and vertical chain links including normal chain links 30, 40, the chain link legs of which are connected by chain link arcs and engage one another alternately in an intractable manner. In the chain strand 50 in front of and behind the chain connector link 10 is arranged in the same installation position as this at least one special chain link 20, the link legs of which comprise the same outer contour, especially the same width and the same thickness, as the outer legs of the connector link parts of the chain connector link 10. Due to the special chain links 20 preceding and trailing the chain connector link and having the same or a marginally larger contour as this, the wear of the chain connector link 10 of the chain strand 50 according to the invention is reduced or avoided if compared to known plough chains.

18 Claims, 3 Drawing Sheets

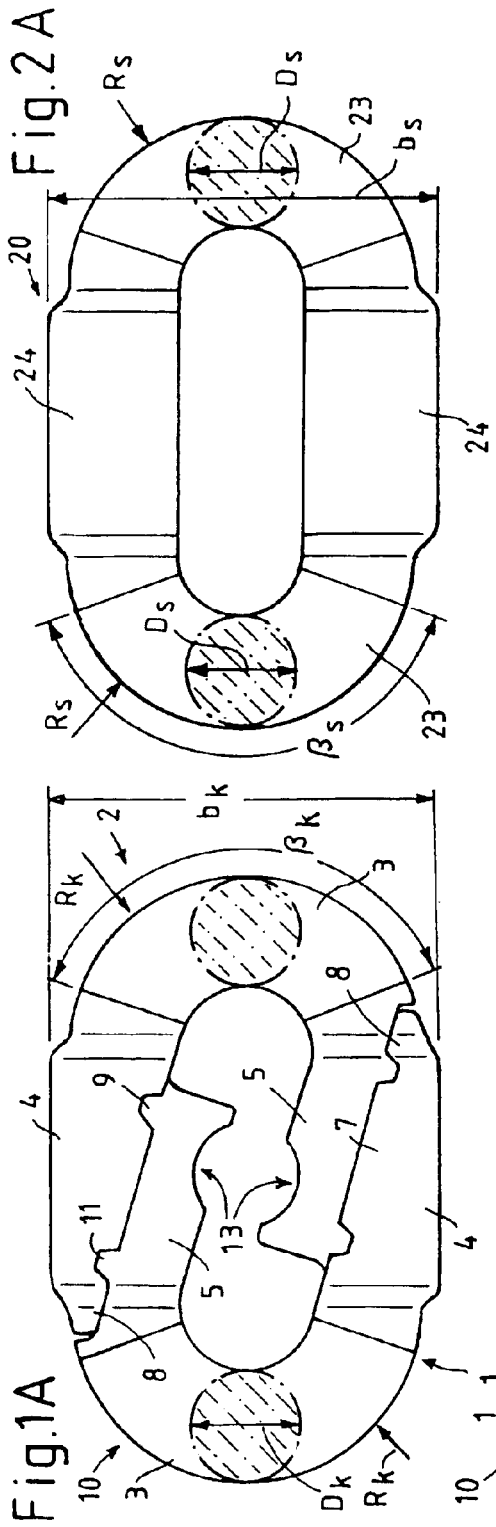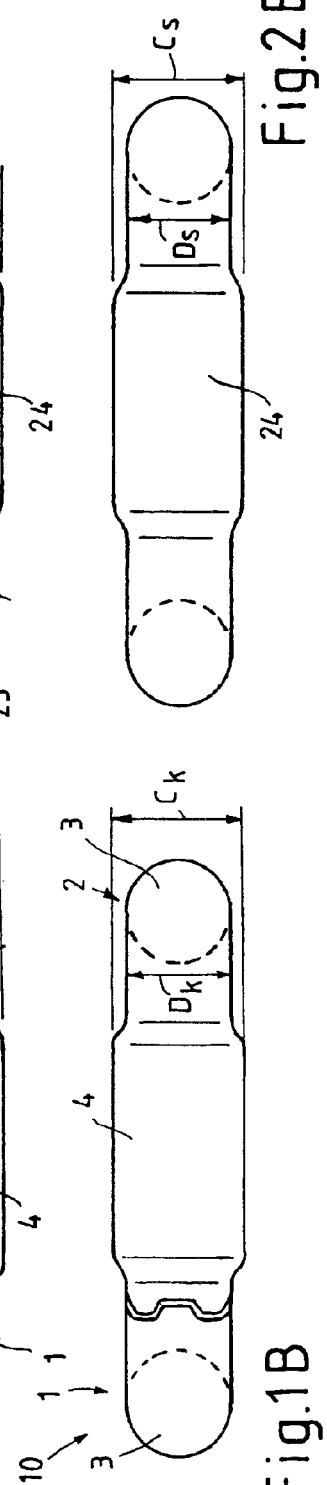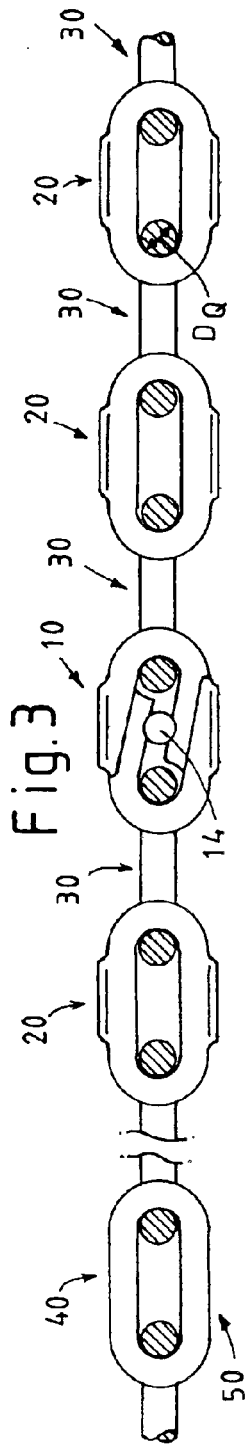

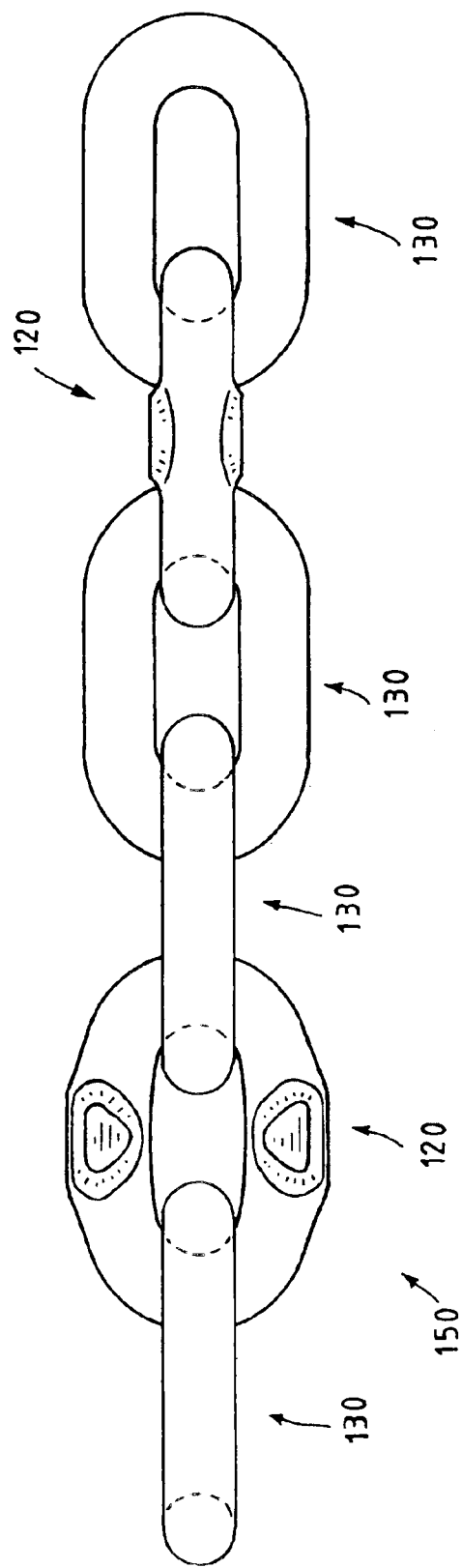

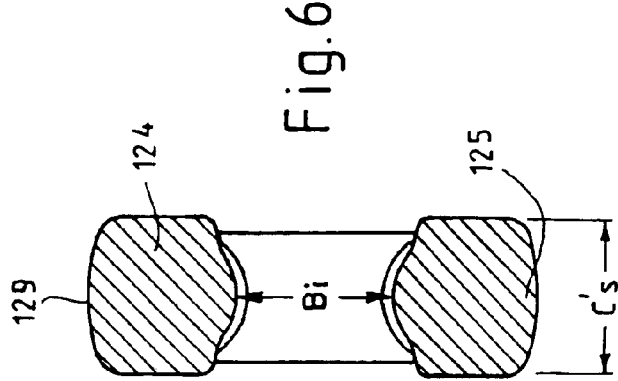
Fig. 6
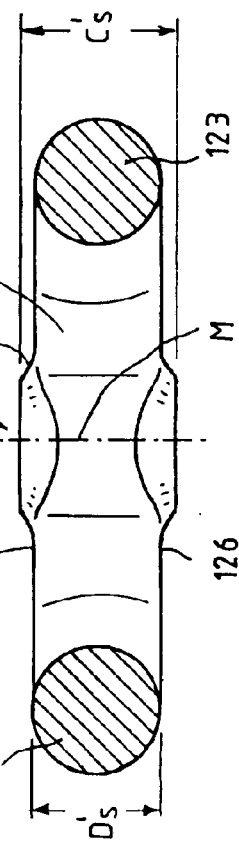
Fig. 5B
Fig. 5A

PLOUGH CHAIN STRAND COMPRISING A CHAIN LOCK LINK

The invention relates to a plough chain strand with horizontal chain links and vertical chain links, the chain link legs of which are connected by means of chain link arcs and engage one another alternately in an intractable manner, and with a chain connector link which connects two chain strand ends, which connector link comprises two chain connector parts which can be locked in a tension-proof manner, comprising the splitting and locking plane at the legs.

Plough chains consist, as is known, of one-piece looplike round links which each comprise spaced parallel chain link legs which are connected via chain link arcs. In a plough chain strand, a vertical chain link respectively engages the oval inner opening between the chain link legs and chain link arcs of a horizontal chain link with its chain link arc, and several hundreds of chain links add on to each other alternately and non-detachably. An underground extraction plough is moved to and for in the longwall face with the plough chain. The plough chain is hereby guided in chain guide channels by plough guide sections, which are for example mounted to chain scraper conveyors, as is known to the expert.

In underground mining, two chain link strands of a plough chain are connected by means of a so-called chain connector or coupling link which comprises two chain connector parts which can be locked in a tension-proof manner or loosened from one another and which comprise the splitting or locking plane in their legs. Such chain connectors are for example known from DE 19901232 A1 or DE 2726235 C3. With the chain connector known from DE 2726235 C3, two essentially W-shaped chain connector parts are connected with a central round chain link without loss, and the two chain strand ends of the plough chain are connected by means of U-shaped hooking parts, which cooperate with the W-shaped chain connector parts and comprise their locking and splitting plane in the legs, in a tension proof manner. As the splitting and locking plane proceeds through the legs in the above-mentioned chain connector parts of the chain connector links, the chain connector parts have a larger dimension in their leg region than the wire cross section of the legs and arcs of the horizontal and vertical chain links. During the use of the plough chain in plough guide sections with chain channels, this leads to a larger wear of the chain connectors compared to the wear at the "normal" horizontal and vertical chain links.

From DE 4420203 C2 is known a typical chain connector link with chain connector halves with respective round chain connector link arcs and flat link legs. The link legs are provided with interlocks for the locking of the chain connector halves and are made wider than the chain connector link arcs; a center piece with flat sides is driven home between the flat connector halves, which piece is inserted by means of a hairpin-shaped spring and a securing pin in the spacing between the flat link legs. The spring lies in grooves at the inner legs of the link legs of the chain connector halves.

From DE 1939000 A1 is known a round link pull chain for a plough in which short sections of the chain of for example six chain links consist of chain links for de-twisting the round link pull chain, which comprise the same material strength as the other chain links, but an enlarged width in the chain link plane. The short chain strand sections are preferably arranged immediately in front of the plough, so as not to have to run over the chain wheel. Two of the broadened and immediately connected chain links can respectively twist with respect to one another around 60° in the longitudinal axis of the chain, so as to create a twisting equalisation of 360° with altogether six chain links.

From DE 4332379 C1 it is known to form the vertical links of a conveyor chain which drag over the land area of the bottom strand and/or top strand stronger than the horizontal links by a certain degree, whereby the service life of the chain can be increased with regard to chains of standard chain links. All horizontal and vertical chain links are formed in the same manner with regard to one another.

Investigations of the applicant have shown that the higher wear of the chain connectors can be attributed to their larger dimensioning in the legs comprising the splitting plane. Furthermore, as the plough guide sections are not optimally flush with one another during underground use, but have continually different bendings with regard to one another, an excessive strain of the chain connector compared to the other horizontal or vertical chain links in the plough chain can not be avoided, even by an optimised adaptation of the chain channels to the dimensioning of the chain connectors. The service intervals for the chain connectors are therefore shorter than for the horizontal and vertical chain links up to now.

It is the object of the invention to create a plough chain strand with horizontal and vertical chain links and at least a chain connector link, in which the higher strain of the chain connector or the chain connector link is minimised or entirely avoided by means of constructive measures at the plough chain.

This object is solved with the invention given in claim 1. According to the invention, it is provided that at least a special chain link is arranged in the chain strand in front of the as well as behind the chain connector link, the link legs of which comprise an outer width and/or an outer thickness which is the same or marginally larger than the outer width or outer thickness of the legs of the assembled chain connector link. According to the invention, at least one chain link of the plough which precedes the chain connector link and which trails after it, is consequently adapted to the outer contour of the chain connector link, so that the unavoidable larger dimensioning of the legs of the chain connector parts of the chain connector link regularly returns in the chain strand and affects the chain connector link less strongly with regard to occurrence of wear and wastage than is the case with plough chains, where the chain links which precede the chain connector link and trail after it are dimensioned smaller than the chain connector link in the dimensioning of the outer contour. If the special chain links are dimensioned larger in the dimensioning of the link legs, which is preferred according to the invention, the loads at the chain connector link even decrease, as the stronger or thicker and wider link legs of the special chain links guide the chain connector link, which is mounted between two special chain links with a small distance to the limiting walls, in the chain guide channels.

In a preferred embodiment, the width and/or thickness of the link legs of the special chain links is about 0 to 5%, preferably 0 to 2% greater than the corresponding width or thickness of the legs of the chain connector link. According to an example of the embodiment, exactly one special chain link in the same installation position as the chain connector link is respectively mounted immediately in front of and immediately behind the chain connector link. Alternatively, several, in particular two to five chain links, which are arranged immediately in front of and immediately behind the chain connector link can consist of special chain links in the same installation position as the chain connector link. Furthermore, all chain links in the same installation position as the chain connector link in a plough chain can alternatively consist of one special chain link, while the other chain links consist of normal chain links. The last embodiment has the advantage that, with an exchange of individual chain links due to wear or chain break, a chain connector can be mounted in an arbitrate position in the plough chain strand without this chain connector link being subject to greater wear as is the case with a chain connector link which was mounted in a predetermined position as the first chain connector link for connecting two chain strand ends.

With some plough guides or drives for plough chains, it can be advantageous if at least the third and sixth chain link in front of and behind the chain connector consist of a special chain link. It is clear that this chain link then does not lie in the same installation position but in an installation position in the plough chain strand which is perpendicular thereto. Alternatively, only every third chain link in front of and behind the chain connector can respectively consist of a special chain link.

With the particularly preferred embodiment, at least the special chain links consist of forged chain links whereby the special chain links can particularly be formed in one piece. Alternatively to one-piece special chain links, wear pieces can be attached, mounted or fastened on the link legs of the special chain links, so that existing plough chain strands can also be retrofitted according to the invention, and, if the wear pieces are excessively worn down, they can be exchanged with other wear pieces. The wear pieces can also be rigidly connected to the link legs and can for example be attached by deposit welding or the like.

With all the above-mentioned examples of alternative embodiments, it is particularly preferred if the link arcs of the special chain links comprise the same cross section, especially the same diameter, as the cross section or the diameter of the link arcs of the chain connector parts and preferably also the further "normal" horizontal or vertical chain links. The chain connector link and the special chain links differ then only in the dimensioning of the link legs or legs of the "normal" chain links. Furthermore, the link arcs of the special chain link preferably comprise the same radius of curvature on the outside as the radius of curvature of the link arcs of the chain connector link and the radius of curvature of the horizontal and vertical chain links.

The chain connector link and the special chain links, with which the chain connector is to be protected from a greater wear due to higher friction, can comprise link legs which comprise swellings over a comparatively large length which have a constant maximum width or a constant maximum thickness with constant cross section. Embodiments of special chain links where the link legs only comprise partial swellings in their width and/or thickness offer particular advantages. By the provision of only partial swellings in the region of the link legs a clamping or locking of the special chain links with the normal chain links connected to these can be avoided to the greatest possible extent. For this, it is particularly advantageous, if the partial swellings of the link arcs increase steadily to the maximum width and/or thickness in the center of the link legs, so that abutment edges are avoided, which would be subject to an increased friction and thereby an increased wear. With the particularly preferred embodiment, the partial swellings with the maximum width and/or the maximum thickness at the outer sides of the link legs extend over a greater length than at the inner sides of the link legs, so as to improve a rolling off of adjacent normal chain links and special chain links engaging the link arcs.

The length of the region of maximum constant thickness at the transition of the outer sides to the transverse sides of the link legs of the special chain links is preferably about 28%±5% of the splitting of the special chain links. With corresponding special chain links, the partial swelling at the transverse sides of the link legs can preferably comprise a region of constant maximum thickness and/or maximum width, whereby sufficient wear reserves are created at the special chain links. In the preferred embodiment, the region of constant thickness can hereby comprise the geometric form of a triangle, so as to additionally optimise the rolling off of adjacent and connected chain links. Alternatively, the geometric form can also form a circle, an ellipse or bridges. Furthermore, the inner sides of the link legs of the special chain links can preferably be curved, preferably elliptically curved, whereby the maximum inner width at the inner sides increases from the link arcs towards the center of the link legs, preferably increases by about 11%±5%. By this measure, the stiffening of the special chain links effected by the partial swellings can be counteracted and the elasticity of the special chain links can be maintained, so as to be able to absorb traction force peaks elastically. The maximum inner width at the center of the link legs can particularly be effected slightly greater than the maximum thickness of the special chain links, so as to be able to make the plough chain lock-free even with directly connected special chain links. Furthermore, the outer sides of the link legs can preferably be curved or bellied from the transition of the link arcs to the partial swellings, in particularly curved in an S-shape, so as to also counteract lock-ups of the special chain links with the normal chain links. The radius of curvature of the S-shaped curvature immediately at the transition to the region of constant maximum width can approximately correspond to the diameter (wire diameter) of the chain link arcs ±10%. The radius of curvature of the outer sides at the transition of the chain link arcs to the chain link legs should be chosen as large as possible with the special chain links, so as to create an approximately smooth transition and to avoid abutment edges.

The invention is now explained in more detail with reference to the schematic drawing. It shows in the drawings:

FIG. 1A a two-part chain connector link in side view;

FIG. 1B the chain connector from FIG. 1A in a plan view;

FIG. 2A a special chain link according to a first embodiment according to the invention in side view;

FIG. 2B the special chain link from FIG. 2A in a plan view;

FIG. 3 an example of an embodiment for a plough chain strand according to the invention;

FIG. 4 an example of an embodiment for a plough chain strand according to the invention with special chain links according to a second embodiment according to the invention.

FIG. 5A a special chain link according to a second embodiment according to the invention in a side view;

FIG. 5B the special chain link from FIG. 5A in plan view; and

FIG. 6 a cross section along VI—VI in FIG. 5A.

FIG. 1A and FIG. 1B show schematically, in side view, and in plan view, a two-part chain connector link 10 with identically formed first chain connector part 1 and second connector part 2 and which are locked in a mirror-inverted manner, which each comprise two chain connector link arcs 3 and an outer leg 4 and an inner leg 5. The outer legs 4 of the chain connector links 1, 2 have at least two holding teeth 7, 8, which cooperate with lock projections 9, 11 at the inner legs 5 of the respective other chain connector part 2, 1 for a tension-proof locking of both chain connector parts 1, 2. The splitting or locking plane of the chain connector link 10 consequently lies in the legs formed by its outer and inner legs 4, 5. The locking position of the chain connector link 10 shown in FIG. 1A and FIG. 1B is secured by means of a locking element (14, FIG. 3), which engages a cylindrical reception 13 at the inner legs 5 of the chain connector parts 1, 2 and which arrests the locking position. The chain connector link 10 has an outer width $b_K$ and a thickness $c_K$ and a circular wire cross section with a diameter $D_K$ in the region of the chain connector link arcs 3 which is smaller than the thickness $c_K$. Furthermore, each chain connector link arc 3 of the two chain connector parts 1, 2 has an outer radius of curvature, called $R_K$ here, in the bow region, which extends over an arc region $\beta_K$ of about 140° with the constant diameter $D_K$.

The special chain link 20 shown in side view and in plan view in FIGS. 2A and 2B is a locked, preferably forged one-piece chain link with two link legs 24, which are connected to one another via two link arcs 23. The link arcs 23 have a circular cross section with a diameter $D_S$ and a radius of curvature $R_S$ at the bow or outer arc of the link arcs 23, which extends over an arc region $\beta_S$ of again about 140°. The outer width of the special chain links 20 at the link legs 24 is designated as $b_S$ in FIG. 2A and the thickness of the link legs 24 is designated as $c_S$ in FIG. 2B. It can easily be seen that the link legs 24 are dimensioned stronger or larger than the cross section or the thickness $D_S$ in the region of the link arcs 23.

According to the invention, there is arranged respectively at least on special chain link 20 in a chain strand 50 in front of the chain connector link 10 as well as behind the chain connector link 10, as shown in an exemplary manner in FIG. 3. In the example of the embodiment of the chain strand in FIG. 3, two special chain links 20 are mounted hereby immediately in front of and immediately behind the chain connector link 10 in the same installation position as the chain connector link 10, while the chain links 30, which connect the special chain links 20 to one another and connect the special chain links 20 to the chain connector link 10, consist of simple round chain links with for example an evenly revolving circular wire cross section $D_Q$. As FIG. 3 further clarifies schematically, further normal chain links 40 with a circular continuous wire cross section can be mounted in the chain strand 50 with a greater distance from the chain connector link 10.

According to the invention, the special chain links 20 are accomplished in such a manner that the outer width $b_S$ is the same or greater than the outer width $b_K$ of the mounted chain connector link 10 and/or the thickness $C_S$ of the special chain link 20 at both link legs 24 is the same or greater than the thickness $C_K$ at the outer leg 4 of both chain connector parts 2, 1. In the schematically shown example of the embodiment, $b_S = b_K$ and $C_S = C_K$. The outer contour of the outer legs 4 of both chain connector parts 1, 2 consequently corresponds to the outer contour of the link legs 24 of the chain links 20.

Particularly preferred are chain strands with embodiments of special chain links 20 and chain connector links 10, where $b_S > b_K$ and/or $C_S > C_K$ applies, whereby only a small difference consists in the percentage region. The cross section in the chain connector link arcs 3 and the link arcs 23 is the same with the chain connector links 10 and the special chain links 20, whereby this round cross section or wire diameter corresponds to that wire diameter $D_Q$ which the normal chain links 30 or 40 in the chain strand comprise according to FIG. 3.

Consequently, in the plough chain strand 50 according to the invention the following applies for all chain links:
$D_K = D_S = D_Q$
$b_S \geq b_K$
$C_S \geq C_K$
$R_S = R_K$
$\beta_S = \beta_K$ FIG. 4 to 6 show a second example of an embodiment of a plough chain 150 with special chain links which are changed with regard to the first example of the embodiment, whereby the same components are provided with numerals which are increased by 100 and the same chain link magnitudes are provided with "'". The chain connector link for the plough chain 150 according to the second example of an embodiment is not shown and can comprise the embodiment according FIG. 1A, 1B.

The section of a plough chain strand 150 shown in FIG. 4 comprises normal chain links 130 and special chain links 120, whereby two normal chain links 130 are arranged between two special chain links 120 respectively. The chain connector link, not shown, can respectively be arranged in the same installation position as two adjacent special chain links 120, so that consequently a special chain link 120 precedes the special chain link as well as trails after it, or two normal chain links 130 are respectively disposed at the preceding and trailing special chain link.

The special chain links 120 shown in FIGS. 5A and 5B in plan and side views consist of one-piece, forged chain links with two link arcs 123 with an essentially circular diameter $D'_S$ and a radius of curvature $R'_S$ at the bow or outer arc of the link arcs 123 and the bows extend with an approximately constant diameter over an arc region of about 150°. Link legs 124 are attached to the two link arcs 123, which legs are provided with partial swellings, which are altogether called 125. The partial swellings 125 form only partial elevations with regard to the transverse sides 126 of the link legs 124, whereby the maximum constant thickness $C'_S$ is the same or greater than the maximum thickness of the chain connector links. The maximum thickness $C'_S$ in the region of the partial swellings 125 is about 25%±10% larger than the diameter $D'_S$. The maximum width $b'_S$, which again is the same or greater than the maximum width of the chain connector links, is about 10%±6% greater than the width of the normal chain links. As can be seen well from FIG. 5A, the partial swellings 125 in the view onto the transverse sides 126 of the link legs 124 have the form of a triangle with an even outer surface, whereby the triangular region with maximum constant thickness $C'_S$ (FIG. 5B) in FIG. 5A is characterised with 127. The region 127 of maximum constant thickness tapers from the outer sides 129 to the inner sides 161 of the link legs 124 on both sides evenly corresponding to the geometry of the triangle, whereby pulling off of the plough chain is also possible even with different positions of the normal chain links embracing the link arcs 123. At the transverse sides 126, the transition to the regions 127 takes place in a steeply running transition zone 128. At the outer sides 129 of the link legs 124 is formed a comparatively stretched transition region 160 with an S-shaped curvature and turning point, whereby the radius of curvature $R'_U$ between the turning point and the region of constant maximum width $b'_S$ essentially corresponds to the diameter $D'_S$±15% of the link arcs. The length L of the region with constant width $b'_S$ amounts to about 28%±10 of the splitting T of the special chain links 120, that is, the distance of the inner curvatures 162 of the link arcs 123. The radius of curvature R'$_S$ before the turning point is larger by a plurality than the radius of curvature R'$_U$, so as to avoid abutment edges at the transition. The inner sides 161 of the link legs 124 are formed elliptically curved between the inner curvatures 162 of the link arcs 123, so that the maximum inner width B'$_I$ at the center plane M of the special chain links 120 is about 1±5% greater than the inner width at the end of the link arcs 123 or than the inner width of the normal chain links.

Not shown are examples of embodiments of a plough chain strand in which every second, therefore all chain links contained in the same mounting position as the chain connector link is/are formed by a special chain link. Furthermore, a plough chain strand is not shown, in which a small number of special chain links are mounted in the same installation position as the chain connector link immediately in front of and immediately behind this in the chain strand.

From the above description, a number of modifications result for the expert, which shall come under the scope of protection of the appending claims. The depiction of the chain connector link in FIGS. 1A, 1B and 3 is only exemplary and shall not limit the range of protection. With other connectors than the shown chain connector, the contour of the outer legs of the chain connector parts can comprise a different geometry, to which is adapted the contour of the outer legs at the special chain links, or made marginally greater. Furthermore, it is not shown that special chain links can be used, with which the adjustment of the outer contour was not provided during the forging process in the link legs, but into which wear pieces can be attached, mounted or welded for example on normal chain links, as are depicted in FIG. 3 or 4 with reference numerals 30, 40 or 130, which provide the corresponding adaptation of the cross section of the link legs or their extension or partial swelling with regard to the outer legs of the chain connector. These and other modifications shall fall under the extent of protection of the appended claims.

What is claimed is:

1. Plough chain strand comprising:
   horizontal chain links and vertical chain links, said horizontal chain links and vertical chain links each having chain link legs connected by chain link arcs, said horizontal and vertical chain links being alternately engaged with one another in an intractable manner;
   a chain connector link which connects two chain strand ends, said chain connector link comprising two chain connector parts which are locked to one another in a tension-proof manner, said chain connector link comprising connector link legs defining an outer width (b$_K$);
   wherein the two chain strand ends each comprise at least one special chain link (20;120) comprising special link legs and special link arcs connecting the special link legs, wherein said special link legs define an outer width (b$_S$;b'$_S$) which is the same or larger than the outer width (b$_K$) defined by the connector link legs of the chain connector link, and wherein the special link legs comprise a greater cross section than the special link arcs.

2. Plough chain strand according to claim 1, wherein the width (b$_S$) defined by the special link legs of the at least one special chain link of each of the two chain strand ends is 0–5% greater than the corresponding width (b$_K$) defined by the connector link legs of the chain connector link.

3. Plough chain strand according to claim 1, wherein exactly one special chain link is mounted in front of and exactly one special link is mounted behind the chain connector link in a same installation orientation as the chain connector link.

4. Plough chain strand according to claim 1, wherein all chain links of the plough chain strand in the same installation orientation as the chain connector link comprise a special chain link.

5. Plough chain strand according to claim 1, wherein at least a third or a sixth chain link in front of or behind the chain connector link comprises a special chain link.

6. Plough chain strand according to claim 1, wherein the at least one special chain link is forged.

7. Plough chain strand according to claim 1, wherein the at least one special chain link comprises wear pieces which are attached to the special link legs.

8. Plough chain strand according to clam 1, wherein the connector link legs are interconnected by connector link arcs having a cross section that is the same as a cross section of the special link arcs.

9. Plough chain strand according to claim 1, wherein the connector link legs are interconnected by connector link arcs that define a radius (R$_K$), and wherein the special link arcs define a radius of curvature (R$_S$) that is the same as the radius (R$_K$) of the connector link arcs.

10. Plough chain strand according to claim 1, wherein the special link legs of the special chain links comprise partial swellings (125) in at least one of their width (b'$_S$) and thickness (C'$_S$).

11. Plough chain strand according to claim 10, wherein the partial swellings (125) increase steadily from the special link arcs to a center (M) of the special link legs (124).

12. Plough chain strand according to claim 10, wherein the special link legs comprise outer and inner sides, and wherein the partial swellings extends at the outer sides over a greater length than at the inner sides.

13. Plough chain strand according to claim 10, wherein the partial swellings comprises a region of constant maximum dimension that has a geometric form of one of a triangle, circle, and an ellipse.

14. Plough chain strand according to claim 10, wherein the special link legs comprise outer sides (129) comprising a curved transition zone (160) located between the special link arcs and the partial swellings (125).

15. Plough chain strand according to claim 1, wherein the special link legs have inner sides (161) that are elliptically curved.

16. Plough chain strand according to claim 1, wherein the special link legs of the at least one special chain link define an outer thickness (C$_S$;C'$_S$) which is the same or larger than an outer thickness (C$_K$) defined by the connector link legs of the chain connector link.

17. Plough chain strand comprising:
    horizontal chain links and vertical chain links, said horizontal chain links and vertical chain links each having chain link legs connected by chain link arcs, said horizontal and vertical chain links being alternately engaged with one another in an intractable manner;
    a chain connector link which connects two chain strand ends, said chain connector link comprising two chain connector parts which are locked to one another in a tension-proof manner, said chain connector link comprising connector link legs defining an outer width (b$_K$);
    wherein the two chain strand ends each comprise at least one special chain link (20;120) comprising special link legs and special link arcs connecting the special link legs, wherein said special link legs define an outer thickness (C$_S$;C'$_S$) which is the same or larger than the outer thickness (C$_K$) defined by the connector link legs of the chain connector link, and wherein the special link legs comprise a greater thickness ($C_S$) than the special link arcs.

18. Plough chain strand according to claim 17, wherein the special link legs of the at least one special chain link define an outer width ($b_S$;$b'_S$) which is the same or larger than the outer width defined by the connector link legs of the chain connector link.

* * * * *